(12) United States Patent
Funane

(10) Patent No.: US 11,374,932 B2
(45) Date of Patent: Jun. 28, 2022

(54) DEVICE MANAGEMENT SYSTEM, AND METHOD

(71) Applicant: CANON KABUSHIKI KAISHA, Tokyo (JP)

(72) Inventor: Nao Funane, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 16/550,077

(22) Filed: Aug. 23, 2019

(65) Prior Publication Data
US 2020/0076801 A1 Mar. 5, 2020

(30) Foreign Application Priority Data

Sep. 5, 2018 (JP) .............................. JP2018-166136

(51) Int. Cl.
*H04L 9/40* (2022.01)
*H04L 67/141* (2022.01)
*H04L 67/10* (2022.01)

(52) U.S. Cl.
CPC ........ *H04L 63/0876* (2013.01); *H04L 63/062* (2013.01); *H04L 67/141* (2013.01); *H04L 67/10* (2013.01)

(58) Field of Classification Search
CPC ... H04L 41/0856; H04L 41/28; H04L 63/062; H04L 63/0876; H04L 67/10; H04L 67/141
See application file for complete search history.

(56) References Cited

U.S. PATENT DOCUMENTS

| 2014/0040425 A1* | 2/2014 | Nakazawa | H04L 41/20 709/217 |
| 2015/0095651 A1* | 4/2015 | Kato | H04L 41/046 713/176 |
| 2016/0127356 A1* | 5/2016 | Fukuda | H04L 63/0838 726/6 |

FOREIGN PATENT DOCUMENTS

JP    2005-63363 A    3/2005

\* cited by examiner

*Primary Examiner* — Gil H. Lee
(74) *Attorney, Agent, or Firm* — Canon U.S.A., Inc. I.P. Division

(57) ABSTRACT

A device management system issues key information for a client tenant that is identified according to input of identification information of a network device via a screen, and, when a key type of the key information received from the network device is reconnection and the network device that is a source from which the key information is sent is a network device that has been managed with the client tenant associated with the key information, send, to the network device, authentication information to reconnect the network device to the device management system.

6 Claims, 9 Drawing Sheets

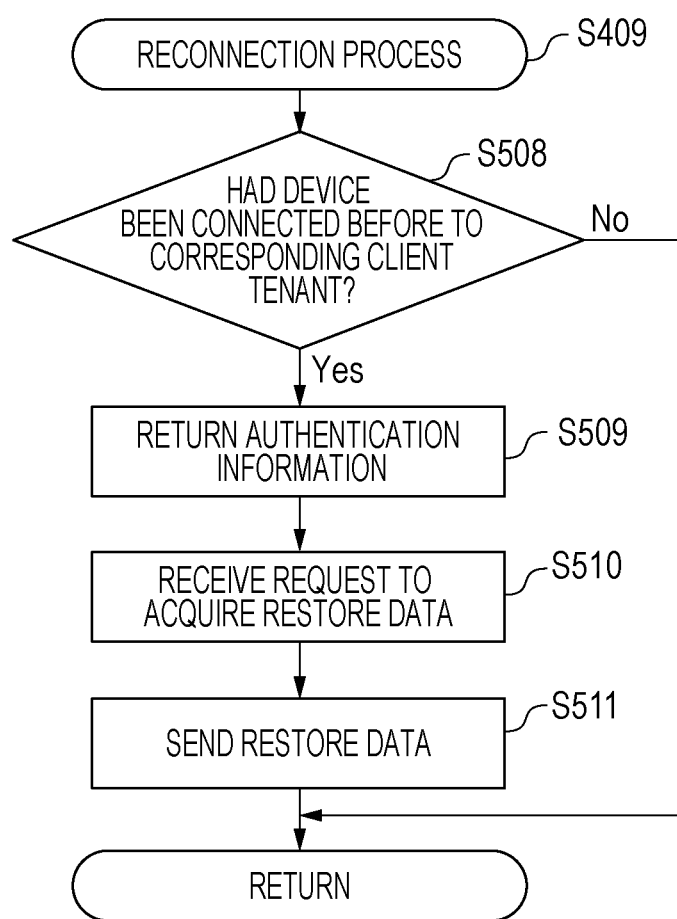

DEVICE MANAGEMENT SYSTEM, AND METHOD

BACKGROUND

Field

The present disclosure relates to a device management system for providing a backup service in which data on a network is backed up onto a cloud system and the data is restored in the event of a network device failure or others.

Description of the Related Art

There are needs to back up data on printers or multifunction peripherals (referred to as network devices) and restore the backup data in the event of storage failures of the network devices.

In Japanese Patent Laid-Open No. 2005-63363, a unit of backing up data on a client device, such as a personal computer, onto a server (cloud system) connected via a network is suggested.

Examples of data to be backed up include an address book and various function settings. Data to be backed up can contain personal information, so security management is, for example, provided. For example, when a service of backing up data of a plurality of clients, including data of their own devices, onto a cloud system is provided, a method of storing pieces of backup data in tenant areas segmented from a data storage area on a client-by-client basis is conceivable from the viewpoint of security. When data on a network device is backed up, the network device sends backup data to a client tenant that is a data storage area separated by tenants on the cloud system. The network device holds authentication information for connection to an appropriate client tenant on a hard disk in the network device and communicates with the cloud system by using the authentication information.

However, when the authentication information for communication with the cloud system is lost because of a failure of the hard disk itself that holds the authentication information or deletion by mistake of an application for communication, the network device is not able to reconnect to the correct client tenant. For example, a restore using backup data is desired when a hard disk is replaced or an application is reinstalled; however, restore work cannot be performed since the network device is not able to reconnect to the correct client tenant.

To quickly perform restore work in the event of a malfunction, such as a hard disk failure of a network device, it is desired to provide a mechanism to reconnect to a correct client tenant without any client's burdensome effort.

SUMMARY

In accordance with an aspect of the present disclosure, a device management system manages information of a network device that a client has in a client tenant for the client. For example, the device management system may include at least one memory storing instructions, and at least one processor which executes the instructions to cause the device management system to provide a first screen to issue key information for causing the network device to reconnect to the device management system, to issue the key information for the client tenant identified according to input of identification information of the network device via the first screen, and to receive the key information from the network device. When a key type of the received key information is reconnection and the network device that is a source from which the key information is sent is a network device that has been managed with the client tenant associated with the key information, execution of the instructions may further cause the device management system to send, to the network device, authentication information to reconnect the network device to the device management system so that data managed in the client tenant associated with the key information is used by the network device. Corresponding method embodiments and computer-readable storage medium embodiments are also disclosed.

Further features of the present disclosure will become apparent from the following description of exemplary embodiments with reference to the attached drawings.

BRIEF DESCRIPTION OF THE DRAWINGS

FIG. 5A and FIG. 5B are flowcharts for illustrating a restore process of the backup service.

DESCRIPTION OF THE EMBODIMENTS

Hereinafter, embodiments of the present disclosure will be described with reference to the accompanying drawings.

Figure 1:
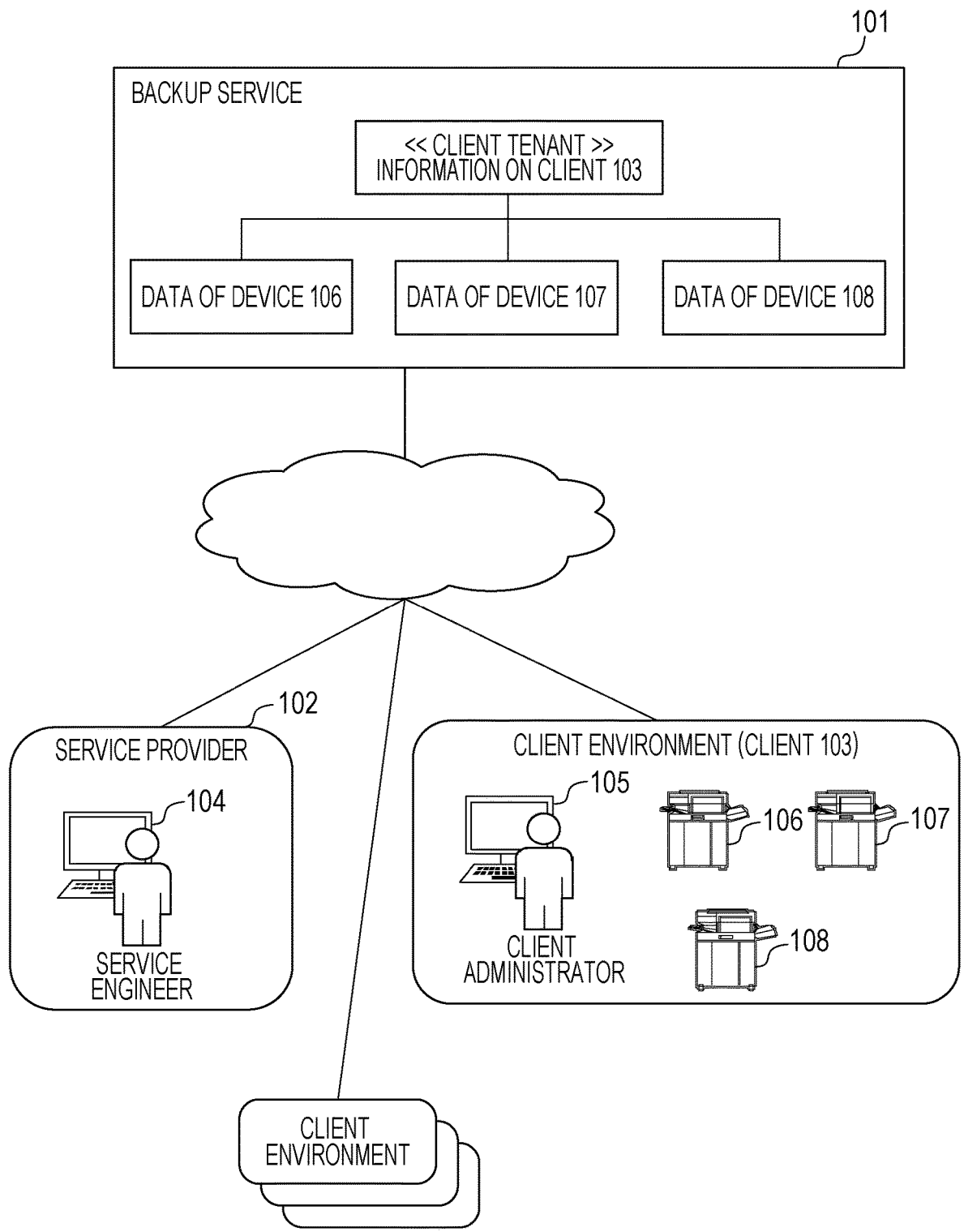
FIG. 1 is a diagram that shows an example of a network system configuration of an embodiment of the present disclosure.

FIG. 1 is a diagram that shows a configuration example of a device management system. A backup service 101 is implemented as a device management system on a cloud system that is provided by one or more information processing devices. On the device management system, information regarding a client(s) that is/are a destination(s) to which the backup service 101 is provided, device information (device ID(s), model(s), authentication information, and other information) of one or more network devices that the client(s) has/have, and backup data of the network device(s) is/are managed.

The backup service 101 saves backup data on a storage service that cooperates with the backup service 101. Backup data contains data, such as setting information of one or more network devices, set values of applications, and address books, which are saved in storage areas, such as HDDs in the one or more network devices that one or more clients have and that are management targets.

The backup service 101 provides a restore function by delivering at least part of backed up data to a network device in response to a request from the network device, for example, when there is any trouble in a storage of the network device. As shown in the diagram, the backup service 101 prepares client tenant areas segmented from a data storage area on a client-by-client basis and manages the client tenant areas in association with backup data of network devices 106 to 108 that a client 103 has in the tenant.

A service provider 102 provides the backup service 101 to clients. A computer 104 that an operator (for example, a service engineer who is in charge of maintenance of network devices) of the service provider 102 has installed a web browser. The computer 104 allows browsing and operation of a website that the backup service 101 provides.

The client 103 gets the backup service 101 for client's own network devices. In a client environment of the client 103, there are one or more network devices on a local area network (LAN). FIG. 1 shows an example in which the client 103 has the network devices 106, 107, 108. The network devices 106 to 108 are communicable with the backup service 101 by using authentication information that is issued after the client makes a contract with the backup service 101.

A computer 105 that a client administrator of the client 103 operates has installed a web browser and has a function of browsing the website that the backup service 101 provides.

Figure 2A:
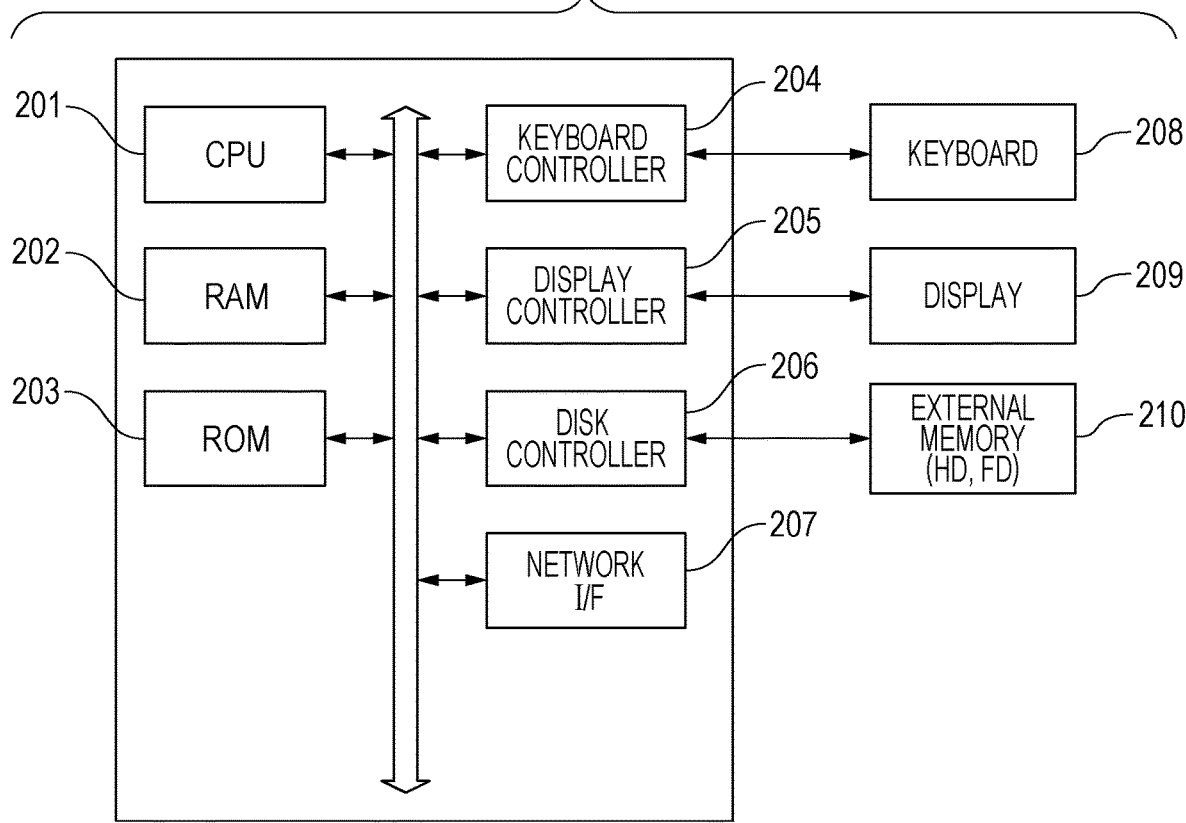
FIG. 2A and FIG. 2B are block diagrams that show examples of hardware configurations of devices in accordance with the present disclosure.

FIG. 2A is a block diagram that shows an example of the hardware configurations of the information processing devices that make up the cloud system on which the backup service 101 runs, computer 104, and computer 105. The backup service 101 may be implemented by using one or more computers or may be implemented by one or more virtual computers that are implemented by a computer(s).

A CPU 201 runs programs stored in a ROM 203 and programs, such as an operating system (OS) and applications, loaded from an external memory 210 onto a RAM 202. The programs include a program that implements a backup service for the backup service 101, and include a web browser for the computer 104 or the computer 105. The CPU 201 functions as processing units that execute processes of flowcharts (described later) by running the programs stored in a readable storage medium. The RAM 202 is a main memory for the CPU 201. The RAM 202 functions as a work area, or the like. A keyboard controller 204 controls operation inputs from a keyboard 208 or pointing device (such as a mouse, a touch pad, a touch panel, and a trackball) (not shown). A display controller 205 controls display on a display 209. A disk controller 206 controls data access to an external memory 210, such as a hard disk (HD) and flexible disk (FD) that store various data. A network I/F 207 is connected to a network. The network i/F 207 executes a process of controlling communication with other devices connected to the network.

Figure 2B:
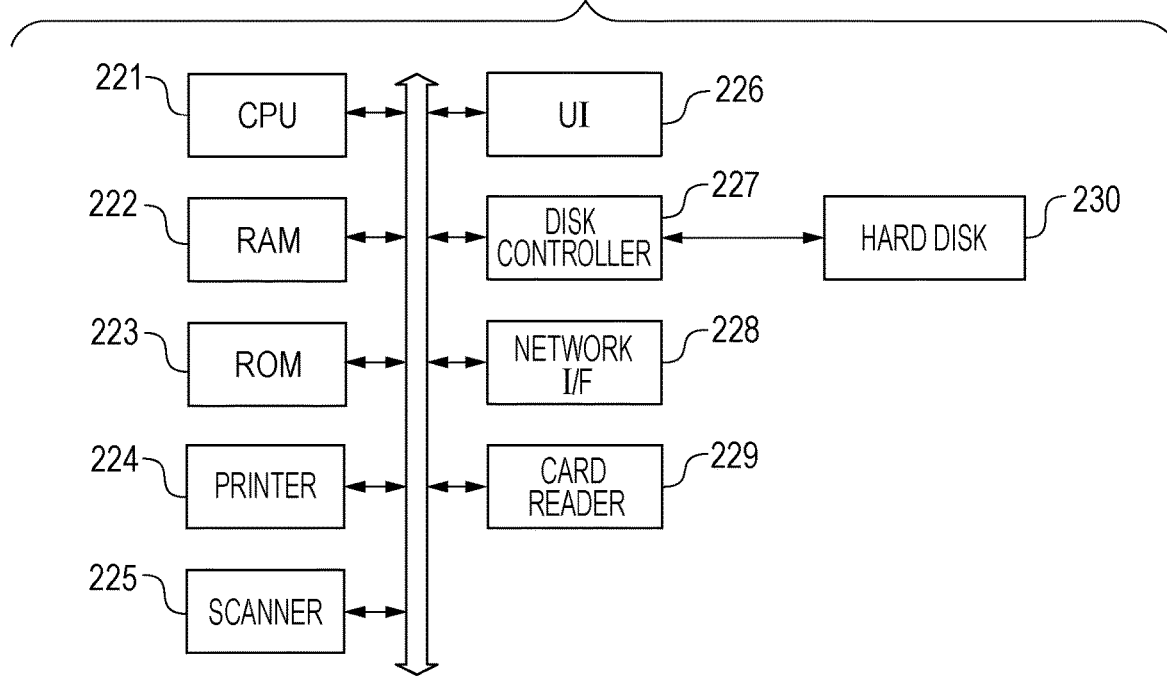

FIG. 2B is a block diagram that shows the hardware configurations of the network devices 106, 107, 108.

A CPU 221 functions as a controller that generally controls the system. The CPU 221 controls a printer 224, a scanner 225, and other devices based on a control program. The control program is stored in a ROM 223, a hard disk 230, or others. The CPU 221 also runs a backup application. The backup application is stored in the hard disk 230. Various pieces of information, such as various setting values and log information of the network device, client information, and license information, are stored in the hard disk 230 in addition to the backup application. Authentication information, or the like, that is used to communicate with the backup service 101 with the use of the function of the backup application and connect to an appropriate client tenant is also stored in the hard disk 230.

The RAM 222 is a main memory of the CPU 221. The RAM 222 functions as a work area, or the like. A user interface (UI) 226 has switches, LED indicators, and others, for operation. The UI 226 plays a role in conveying to the CPU 221 information that the system user inputs through the UI 226. A disk controller 227 controls data access to the hard disk 230 that stores various data.

The network I/F 228 is connected to the network. The network I/F 228 executes a process of controlling communication with other devices connected to the network. A card reader 229 plays a role in conveying login information of a user to the CPU 221. When a user brings an IC card into contact with the card reader 229 at the time of logging onto the network device, the card reader 229 reads information on the IC card and conveys the information to the CPU 221. The CPU 221 compares the information on the IC card with user information stored in advance in the hard disk 230 and executes a login process for the user.

The network devices 106, 107, 108 are configured to be able to install applications that execute additional functions in addition to basic functions, such as printing and scanning.

Figure 3A:
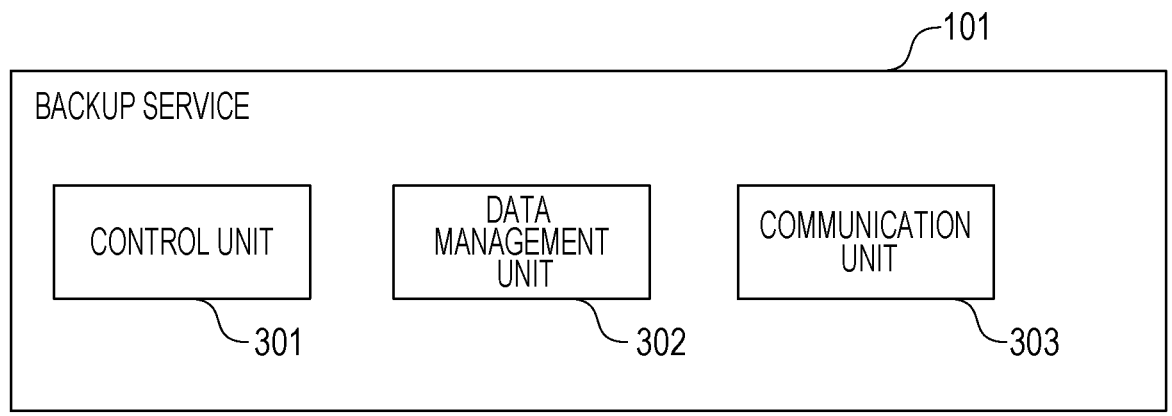
FIG. 3A and FIG. 3B are block diagrams that show examples of the functional configurations of devices in accordance with the present disclosure.

FIG. 3A is a block diagram that shows an example of the functional configuration of the backup service 101. The backup service 101 is made up of a control unit 301, a data management unit 302, and a communication unit 302. The backup service 101 is implemented when the CPU 201 reads a program stored in the ROM 203 of a computer, on which the backup service 101 runs, onto the RAM 202 and executes the program.

The control unit 301 is a software module that receives various process execution instructions from the website that the backup service 101 provides or processing requests from the network device 106 and executes various processes. The data management unit 302 stores data in databases that are constructed in the hard disk 210 or a storage service, such as a storage device on the network, consults data, or reads data from the databases. When the data management unit 302 stores backup data of the network device, the data management unit 302 prepares a tenant for the client who has the network device on the storage service and stores data on the client tenant as described above. The communication unit 303 is a software module that is configured in the network I/F 207 and executes control for communication with an external device.

Figure 3B:
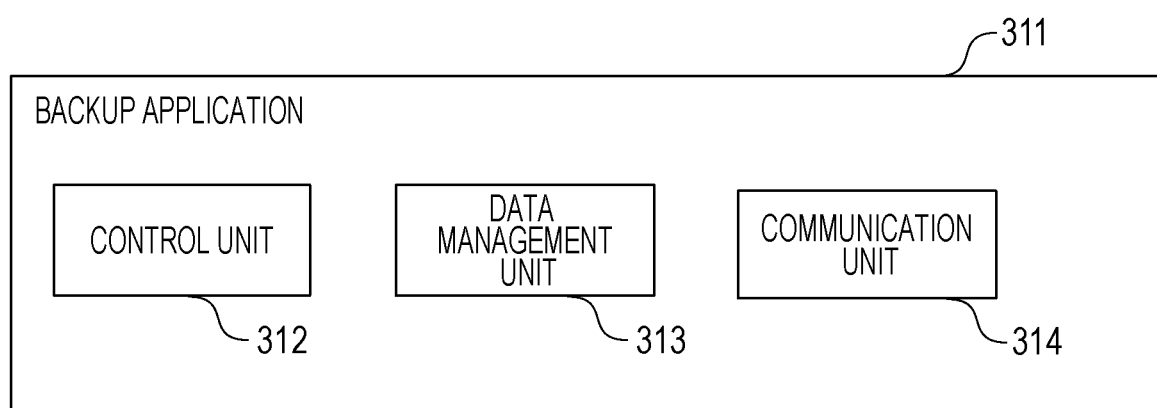

FIG. 3B is a block diagram that shows an example of the functional configuration that is implemented by running a backup application 311 on the network device 106, the network device 107, or the network device 108. The backup application 311 is made up of a control unit 312, a data management unit 313, and a communication unit 314.

The control unit 312 is a software module that receives various process execution instructions or others through the UI 226 and executes various processes. The data management unit 313 reads data to be backup data from the hard disk 230 or restores data acquired from the backup service 101. The communication unit 314 is a software module that is configured in the network I/F 228 and executes control for communication with an external device.

Figure 4A:
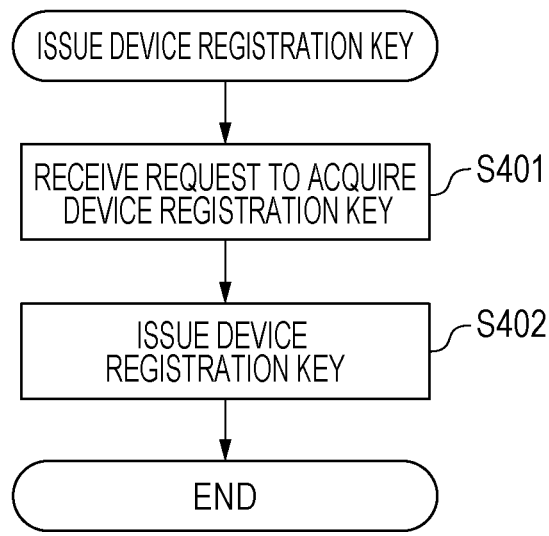
FIG. 4A and FIG. 4B are flowcharts for illustrating a process of starting a backup service.
Figure 4B:
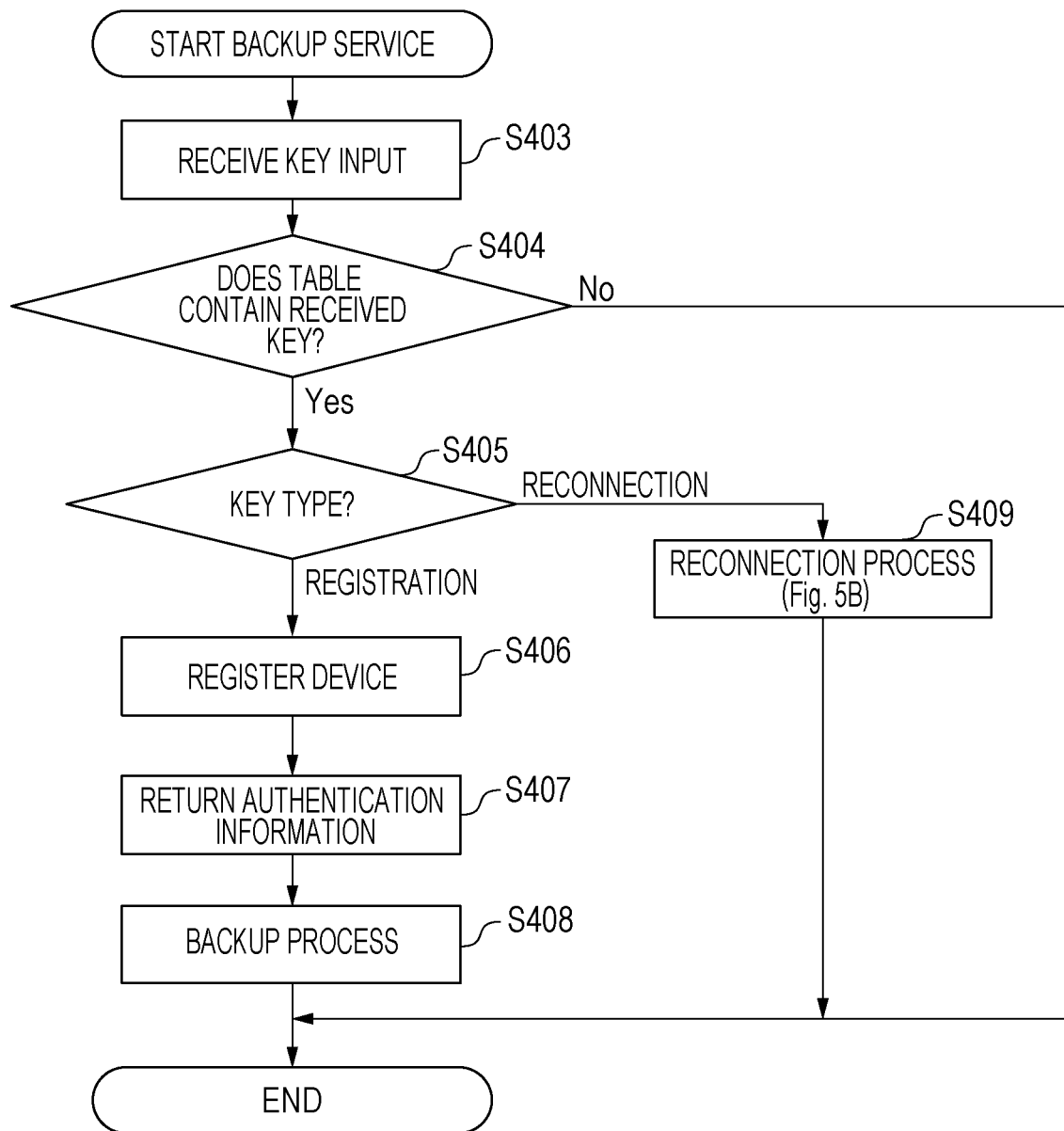

FIG. 4A and FIG. 4B are flowcharts for illustrating a process in which the service provider 102 sells the network device 106 to the client 103 and starts a service for the network device 106 in the backup service 101.

As a precondition, the control unit 301 of the backup service 101 receives an instruction to create a tenant for the client 103 through operation on the website that the backup service 101 provides with the use of the computer 104 of the service provider 102 and creates a client tenant for the client 103.

FIG. 4A is a flowchart for illustrating a process of issuing a device registration key for the network device 106 in the backup service 101.

Figure 6A:
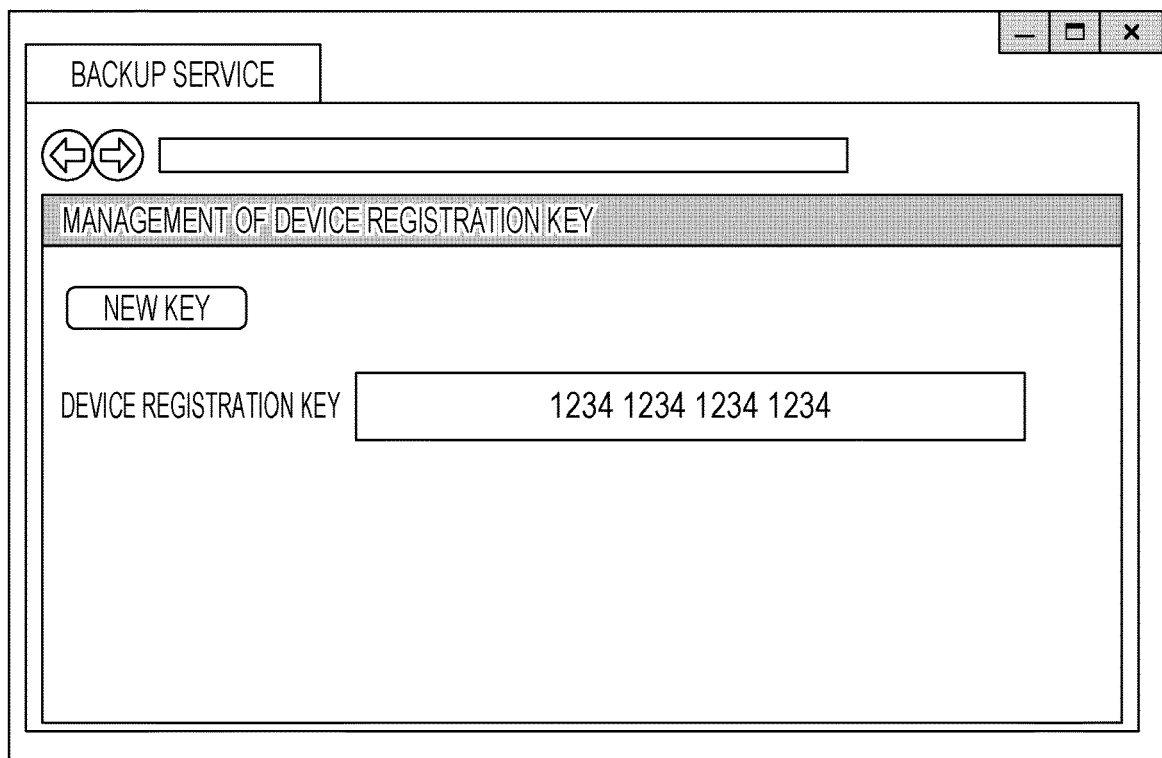
FIG. 6A and FIG. 6B are examples of websites that the backup service provides.

In S401, the control unit 301 receives a request to acquire a device registration key. The client administrator of the client 103 operates with the computer 105 on the website that the backup service 101 provides, and requests to acquire a device registration key. FIG. 6A is an example of a registration key acquisition screen that shows up on the website. The website that the backup service 101 provides sets access restriction for each client tenant and allows only a designated client administrator to access. When the client administrator presses a NEW KEY button, the control unit 301 receives a request to acquire a device registration key.

In S402, the control unit 301 issues a device registration key for the client 103. The issued device registration key shows up on the website that the backup service 101 provides. A device registration key is a key for associating a client tenant allocated to each client with identification information of a network device that the client has. A device registration key is issued by the backup service 101 one for each client tenant and is stored and managed in the client tenant by the data management unit 302. In this example embodiment, a device registration key is, for example, 16-digit numeric value.

When a device registration key of the client tenant has been already issued at the time when the client administrator opens the website shown in FIG. 6A, the data management unit 302 acquires the issued device registration key and shows the issued device registration key on the website.

Table A is an example of a key management table that the data management unit 302 manages. Table A contains a client tenant name, a key, and a key type. Any one of registration and reconnection is contained for key type. The key type of the device registration key issued through the registration key acquisition screen shown in FIG. 6A is registration.

TABLE A

| Client Tenant Name | Key | Key Type |
|---|---|---|
| Client 103 | 1234123412341234 | Registration |

FIG. 4B is a flowchart for illustrating a process of starting a backup service for the network device 106 by using a device registration key in the backup service 101.

Figure 7:
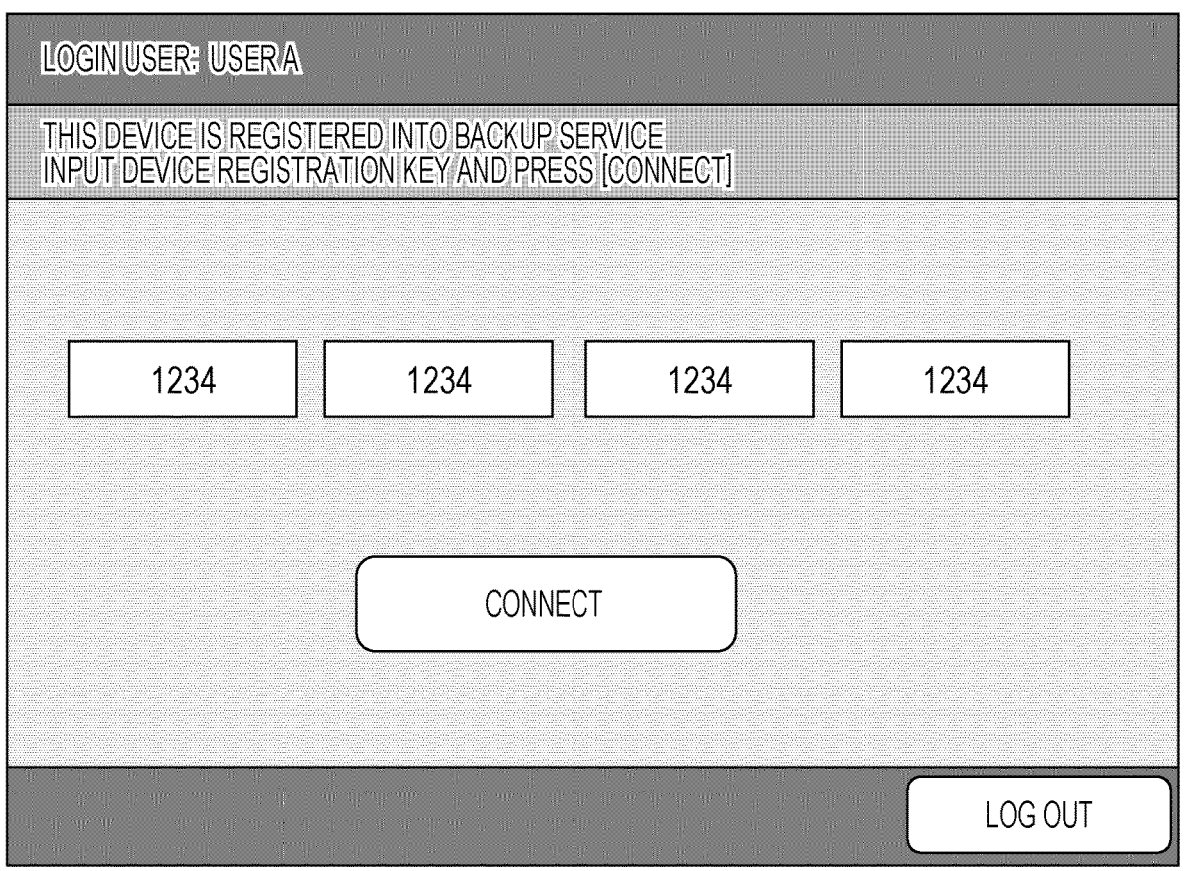
FIG. 7 is an example of a user interface that a backup application provides.

When the backup application 311 installed in any one of the network devices 106 to 108 is launched, the backup application 311 shows a registration key input screen on the UI 226. The client administrator inputs the device registration key issued in S402 into the registration key input screen. FIG. 7 is an example of the registration key input screen that is shown on the UI 226. The client administrator inputs the key and then presses a connect button. Thus, the client administrator provides an instruction to connect the network device 106 to the backup service 101.

When the control unit 312 of the backup application 311 receives an instruction to connect to the backup service 101, the control unit 312 sends identification information (device ID) that identifies the network device 106 and the input device registration key to the backup service 101 via the communication unit 314. A device ID is a serial number. In this example embodiment, it is assumed that the serial number of the network device 106 is "106".

In S403, the backup service 101 receives key information from the backup application 311 installed on the network device 106 in the client environment via the communication unit 303. The backup service 101 also receives the identification information (serial number) of the network device 106. For example, as a result of input of the device registration key, the backup service 101 receives the device registration key as key information.

In S404, the control unit 301 consults the key management table (Table A) and determines whether Table A contains the received device registration key. When Table A does not contain the received registration key, the control unit 301 returns an error to the backup application 311, and ends the process. When Table A contains the received registration key, the process proceeds to S405.

In S405, the control unit 301 determines the key type of the received key information based on the key management table and proceeds to S406 when the key type is registration or proceeds to S408 when the key type is reconnection. The process of S409 in the case where the key type is reconnection will be described with reference to FIG. 5B.

In S406, the control unit 301 identifies the client tenant that is a destination to which the network device is to connect based on the client tenant name in the key management table, and the data management unit 302 enters information on the network device into the area of the client tenant.

In the case of this example embodiment, the serial number of the network device 106 is entered into the client tenant of the client 103. Table B shows an example of a client device management table after the serial number of each device is entered into the client tenant of the client 103 for each of the network devices 106 to 108 installed in the client environment of the client 103.

TABLE B

| Client Tenant Name | Network Device |
|---|---|
| Client 103 | 106, 107, 108 |

In S407, the control unit 301 returns the result of successful connection together with authentication information to the backup application 311. The backup application 311 uses the authentication information returned here in communicating with the backup service 101.

When the data management unit 313 of the backup application 311 receives the result of successful connection from the backup service 101, the data management unit 313 saves the received authentication information in the hard disk 230. The data management unit 313 also shows on the UI 226 that the connection is complete and shows a screen for executing a backup function and a restore function. After that, when the backup application 311 is launched, the registration key input screen shown in FIG. 7 does not show up because the authentication information is held in the hard disk 230, and the screen for executing the backup function and the restore function shows up.

When the backup application 311 is instructed to execute the backup function, backup data is created from at least part of data stored in the hard disk 230 of the network device on which the backup application 311 itself is installed, and sends the backup data to the backup service 101 together with the device ID. At this time, the backup application 311 communicates with the backup service 101 by using the above-described authentication information. The backup application 311 may periodically perform backup.

In S408, the control unit 301 of the backup service 101 receives the backup data via the communication unit 303. The data management unit 302 checks the authentication information and stores the authentication information in the area of the intended client tenant in association with the device ID that identifies the source network device and the received backup data.

In a client tenant, N (N is an integer greater than or equal to one) pieces of backup data can be managed for a network device. When there is a request for (N+1)-th backup or more, old backup data is overwritten.

Figure 5A:
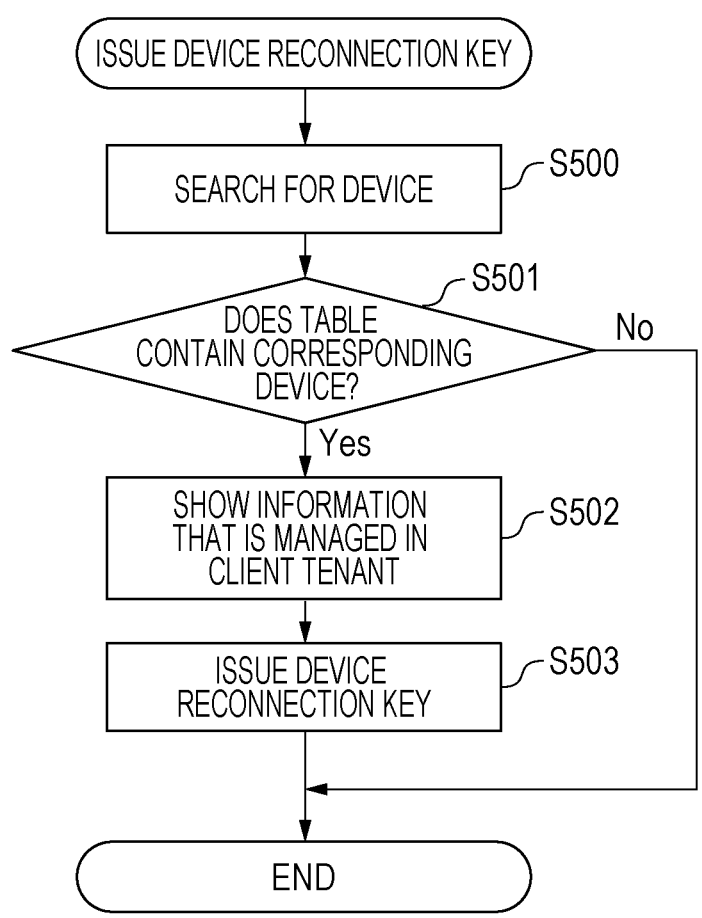

FIG. 5A and FIG. 5B are flowcharts for illustrating a restore process in the backup service 101. In this example embodiment, an example in which, when the hard disk of the network device 106 fails, the service engineer of the service provider 102 replaces the hard disk and then provides an instruction to execute a process of restoring data will be specifically described.

FIG. 5A is a flowchart for illustrating a process of issuing a reconnection key for the network device 106 in the backup service 101.

Figure 6B:
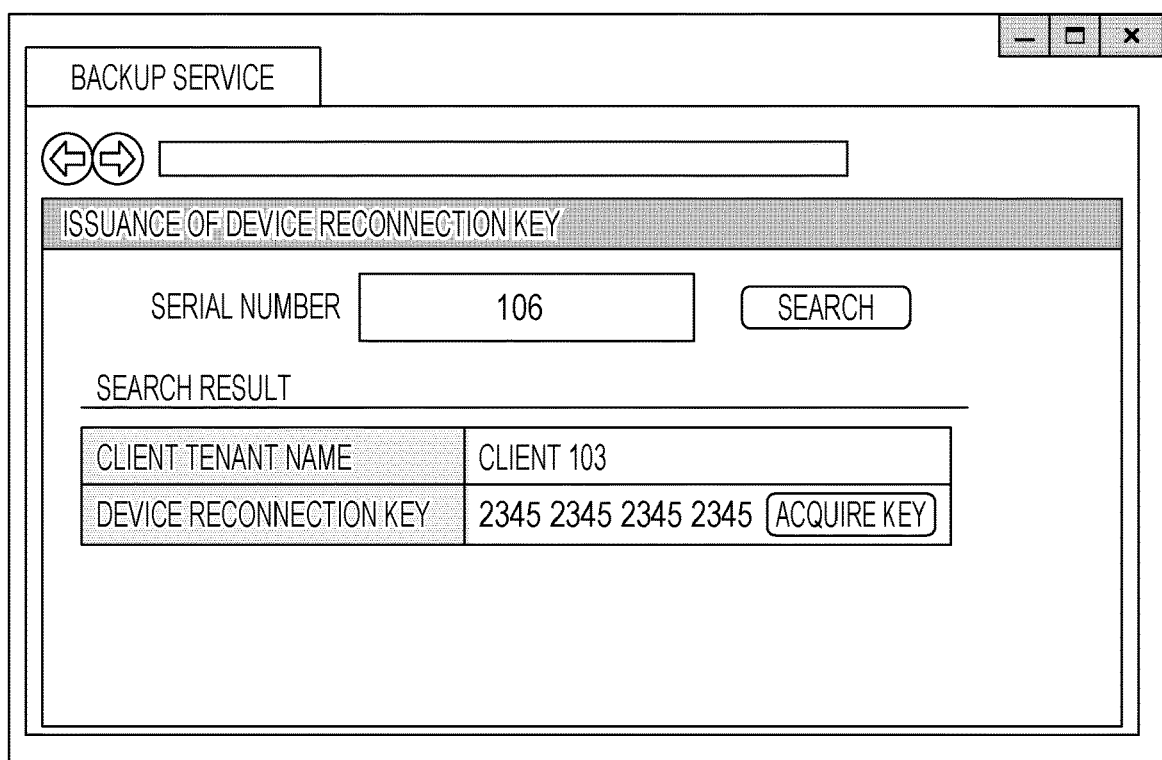

FIG. 6B is a website that is provided when the service engineer of the service provider 102 accesses the backup service 101 with the use of the computer 104 and particularly shows a reconnection key issuance screen for a network device. The service engineer inputs the serial number of the network device 106 whose hard disk has failed on the reconnection key issuance screen and then presses a search button.

In S500, when the control unit 301 receives information that the search button is pressed, the control unit 301 searches the client device management table (Table B) for the input serial number. In S501, the control unit 301 determines whether the client device management table contains the serial number. When the client device management table does not contain the serial number, the control unit 301 shows that the network device is not listed, and ends the process. When the client device management table contains the serial number, the process proceeds to S502.

In S502, the control unit 301 additionally shows information (client tenant name) on the client tenant that is managed in association with the input serial number on the website shown in FIG. 6B. The website further shows a key acquisition button for issuing a reconnection key. The service engineer of the service provider 102 checks the shown client tenant information and presses the key acquisition button.

In S503, the control unit 301 issues a reconnection key for the client tenant in response to the pressing of the key acquisition button. The reconnection key additionally shows up on the website shown in FIG. 6B. Thus, the service engineer can get the reconnection key.

A reconnection key is a key for identifying a network device whose device ID has been already entered into a client tenant. A reconnection key is issued by the backup service 101 for a client tenant and is stored and managed in the client tenant by the data management unit 302. In this example embodiment, a reconnection key is, for example, 16-digit numeric value. A reconnection key can be issued again each time the key acquisition button is pressed.

Table C shows an example in which the reconnection key of the client 103 is further contained in the key management table shown in Table A. The key information of the reconnection key is 2345234523452345, and the key type of the reconnection key is reconnection.

TABLE C

| Client Tenant Name | Key | Key Type |
| --- | --- | --- |
| Client 103 | 1234123412341234 | Registration |
| Client 103 | 2345234523452345 | Reconnection |

FIG. 5B is a flowchart for illustrating a reconnection process in S409 of FIG. 4B.

The service engineer replaces the failed hard disk of the network device 106 with a new hard disk. After the replacement, the service engineer installs the backup application 311 onto the network device 106. Since the hard disk has been replaced, the authentication information that had been saved in the old hard disk and that the backup application 311 uses to communicate with the backup service 101 is lost.

When the service engineer launches the backup application 311, the backup application 311 shows the registration key input screen on the UI 226 as in the case of FIG. 4B since there is no authentication information. In this process, as a precondition, it is assumed that the service engineer has input the reconnection key shown in S503 through the registration key input screen. After this input, when the service engineer presses the connect button shown in FIG. 7, the backup service 101 receives the reconnection key via the communication unit 303 in S403. After that, when it is determined in S405 that the key type is reconnection, the process is started.

In S508, the control unit 301 consults the client device management table (Table B) and determines whether the serial number "106" of the network device 106 has been connected before to the client 103 that is managed in association with the reconnection key. When the network device 106 has been listed as the network device of the client 103 in the client device management table (Table B), the process proceeds to S509. When the network device 106 has not been listed as the network device of the client 103 in the client device management table (Table B), the control unit 301 returns an error to the backup application 311 and ends the process. Thus, a network device that has a failed hard disk is not connected to a wrong client tenant to which there is no history of connection before by misoperation of the service engineer, or the like.

Specifically, this prevents a service engineer who manages a plurality of clients from connecting a network device of one of the clients to a different client tenant by using a wrong key, for example, when there occurs a failure at the same time in network devices that the clients respectively have.

In S509, the control unit 301 returns the fact that reconnection is successful and the authentication information to the backup application 311. Authentication information is information that the backup application 311 uses to connect to the backup service 101. In S509, authentication information different from the authentication information issued in S407 before is reissued for the network device 106 on which the backup application 311 is installed.

When the data management unit 313 of the backup application 311 receives information that reconnection is successful, the data management unit 313 saves the authentication information received together in the replaced hard disk. The data management unit 313 also shows the fact that reconnection is successful on the UI 226 and further shows a screen for executing the restore function.

In this example embodiment, an example in which a device registration key and a reconnection key are input on the common reconnection key input screen shown in FIG. 7 is described; however, a device registration key and a reconnection key may be input on different screens. For example, a link to the reconnection key input screen may be provided on the reconnection key input screen, and a reconnection key may be input through the reconnection key input screen in the case of reconnection. In this case, each of the key management tables (Table A and Table C) may be separated into a device registration key management table and a reconnection key management table and managed.

In this example embodiment, the device registration key and the reconnection key each have a similar coding scheme like 16-digit numeric value. Alternatively, the device registration key and the reconnection key may be managed in different coding schemes, and whether a device registration key and a reconnection key may be determined based on the coding scheme.

When reconnection of the backup application 311 of the network device 106 to the backup service 101 is complete and a screen for executing the restore function shows up, the service engineer provides an instruction to execute a restore through the screen. In response to the execution instruction, the control unit 312 of the backup application 311 requests to the backup service 101 to acquire restore data.

In S510, the backup service 101 receives the request to acquire restore data from the backup application 311 via the communication unit 303.

In S511, the control unit 301 acquires backup data associated with the source network device 106 via the data management unit 302 and sends the backup data to the backup application 311 as restore data.

The control unit 312 of the backup application 311 that has received the restore data from the backup service 101 executes a restore process on the replaced hard disk. Thus, work for restoring data to a new hard disk by using data backed up before a hard disk failure can be performed.

Application Example 1

In the present example embodiment, an example of the case where a hard disk of a network device fails is described; however, a similar configuration is applicable to a case where authentication information is lost because of any reason other than the hard disk failure. Data containing authentication information stored in a hard disk can be lost, for example, when the backup application 311 is erroneously uninstalled. In such a case as well, a reconnection key is issued and then used. Thus, reconnection to the backup service 101 or a restore process using backup data managed in a client tenant to which the network device belongs are possible.

Application Example 2

As a result of searching for a network device in S501, it is conceivable that a plurality of client tenants can be found. For example, this is the case where the network device 106 is transferred from a client to another client. When the network device 106 had been connected to a client tenant B before and, after that, the network device 106 is connected to another client tenant C without a process of cancelling the connection to the client tenant B, the network device 106 is associated with both the client tenant B and the client tenant C in the client device management table (Table B).

In this case, when a search for the serial number of the network device 106 is performed on the reconnection key issuance screen (FIG. 6B), two client tenants, that is, the client tenant B and the client tenant C, are found.

In this Application Example, in such a case, a network device registration date and time may be shown in addition to a client tenant name as information that the service engineer uses to determine a correct client tenant to be reconnected. When the data management unit 302 registers the network device 106 into the backup service 101, the data management unit 302 also stores a registration date and time of the network device 106 together. Thus, the above control for showing network device registration date and time is implemented.

Furthermore, of found client tenants, only a client tenant whose network device registration date and time is new may be shown on the screen.

Other than the above, the data management unit 302 may record a date and time, at which backup data is stored, at the time of backup, and may show only a client tenant whose date of storage of backup data is new may be shown on the screen as a client tenant to be reconnected.

Application Example 3

In this example embodiment, a reconnection key is issued for the client tenant of the client 103. In other words, other than the network device associated with the serial number used in the search of FIG. 6B, the reconnection key may be directly used to reconnect another network device(s) in the same client environment.

For example, when the hard disk of the network device 106 and the hard disk of the network device 107 fail at the same time, the reconnection key issued by searching for the serial number of the network device 106 may also be used to reconnect the network device 107. There is a case where, when the service engineer receives network device failure notification from a client, the client does not know the serial number of the failed network device. In such a case, even when the serial number of another network device installed in the same client environment is used, a reconnection key can be acquired.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-166136, filed Sep. 5, 2018, which is hereby incorporated by reference herein in its entirety.

What is claimed is:

1. A device management system that manages information of a network device that a client has in a client tenant for the client, the device management system comprising:
  at least one memory storing instructions; and
  at least one processor which executes the instructions causing the device management system to:
  provide a first screen to issue key information for causing the network device to reconnect to the device management system;
  issue the key information to the client tenant identified according to input of identification information of the network device via the first screen;
  receive, in response to the key information being input to the network device by a user's operation, the key information from the network device; and
  when a key type of the received key information is reconnection and the network device that is a source from which the key information is sent is a network device that has been managed with the client tenant associated with the key information, send, to the network device, authentication information to reconnect the network device to the device management system so that data managed in the client tenant associated with the key information is used by the network device.

2. The device management system according to claim 1, wherein
  the instructions further cause the device management system to provide a second screen to issue key information for entering a new network device into the device management system.

3. The device management system according to claim 2, wherein
  the instructions further cause the device management system to, when the key type of the received key information is registration, send, to the network device, authentication information to connect the network device to the device management system, so that data of the network device that is the source from which the key information is sent is managed in the client tenant associated with the key information.

4. The device management system according to claim 1, wherein
  on the network device, the authentication information received from the device management system is saved in a hard disk of the network device and managed.

5. The device management system according to claim 1, wherein
  in the client tenant, data saved in a hard disk of the network device is managed in association with the network device as backup data.

6. A method for a device management system that manages information of a network device that a client has in a client tenant for the client, the method comprising:
  providing a first screen to issue key information for causing the network device to reconnect to the device management system;
  issuing the key information to the client tenant identified according to input of identification information of the network device via the first screen;
  receiving, in response to the key information being input to the network device by a user's operation, the key information from the network device; and
  when a key type of the received key information is reconnection and the network device that is a source from which the key information is sent is a network device that has been managed with the client tenant associated with the key information, sending, to the network device, authentication information to reconnect the network device to the device management system so that data managed in the client tenant associated with the key information is used by the network device.

* * * * *